United States Patent
Mathavu et al.

(10) Patent No.: US 7,657,566 B2
(45) Date of Patent: Feb. 2, 2010

(54) COMPUTER IMPLEMENTED METHOD AND SYSTEM FOR HANGING PROTOCOL CONFIGURATION SIMULATOR DISPLAYING DESIRED ORDER OF MEDICAL IMAGES DATA

(75) Inventors: Shivaprasad Mathavu, Erlangen (DE); Steinar Kolbu, Erlangen (DE); Wolfgang Kuhn, Landau (DE)

(73) Assignee: Siemens Aktiengesellschaft, Munich (DE)

( * ) Notice: Subject to any disclaimer, the term of this patent is extended or adjusted under 35 U.S.C. 154(b) by 275 days.

(21) Appl. No.: 11/586,845

(22) Filed: Oct. 25, 2006

(65) Prior Publication Data

US 2007/0159962 A1 Jul. 12, 2007

Related U.S. Application Data

(60) Provisional application No. 60/757,683, filed on Jan. 10, 2006.

(51) Int. Cl.
G06F 17/00 (2006.01)
G06F 17/30 (2006.01)
G06K 9/00 (2006.01)

(52) U.S. Cl. .................. 707/104.1; 707/102; 707/10; 382/130

(58) Field of Classification Search ............... 707/1–3, 707/6, 10, 100, 102, 104.1, 200; 715/792; 345/618–619, 629, 650, 33, 625; 382/305, 382/128, 276, 130–131; 600/424; 705/2–3; 706/924; 250/390.02; 709/201, 203–204
See application file for complete search history.

(56) References Cited

U.S. PATENT DOCUMENTS 5,805,118 A * 9/1998 Mishra et al. ............... 345/1.1

(Continued)

FOREIGN PATENT DOCUMENTS

EP 1207683 * 5/2002

(Continued)

OTHER PUBLICATIONS

Hui Luo, et al. "Automatic hanging protocol for chest radiographs",Medical Imaging 2005: PACS and Imaging Informatics, edited by Osman M. Ratib, Steven C. Horii, Proceedings of SPIE vol. 5748 (SPIE, Bellingham, WA, 2005), pp. 33-42.*

(Continued)

Primary Examiner—Srirama Channavajjala
(74) Attorney, Agent, or Firm—Schiff Hardin LLP

(57) ABSTRACT

A hanging protocol simulator system and method permit the design and storage of hanging protocol without requiring the actual hardware utilized in the design. The creation and/or modification of hanging protocols can be made either: a) automatically, by sending images to the simulator and receiving the configuration based on these images, or b) manually, in which case the user utilizes a hanging protocol editor to define the preferred screen layout. The user can define a preferred screen layout and then test it, without need of available real hardware, and can check the performance of the configuration long before investing in the ultimately required hardware. A database is provided for storing hanging protocols which can be accessed, and/or user-provided input can further be provided to define or refine hanging protocols.

9 Claims, 6 Drawing Sheets

U.S. PATENT DOCUMENTS

| | | | |
|---|---|---|---|
| 6,177,937 B1* | 1/2001 | Stockham et al. | 715/807 |
| 6,891,920 B1* | 5/2005 | Minyard et al. | 378/37 |
| 7,058,901 B1* | 6/2006 | Hafey et al. | 715/792 |
| 7,085,804 B2* | 8/2006 | Nolte | 709/201 |
| 7,162,623 B2* | 1/2007 | Yngvesson | 713/1 |
| 7,327,864 B2* | 2/2008 | Deaven et al. | 382/128 |
| 2002/0091659 A1* | 7/2002 | Beaulieu et al. | 706/62 |
| 2003/0093296 A1* | 5/2003 | Lee et al. | 705/2 |
| 2003/0101291 A1* | 5/2003 | Mussack et al. | 709/328 |
| 2003/0187689 A1* | 10/2003 | Barnes et al. | 705/2 |
| 2004/0141661 A1* | 7/2004 | Hanna et al. | 382/305 |
| 2004/0193901 A1* | 9/2004 | Bharara | 713/193 |
| 2005/0025349 A1* | 2/2005 | Crewe | 382/128 |
| 2005/0110788 A1* | 5/2005 | Turner et al. | 345/419 |
| 2005/0111757 A1* | 5/2005 | Brackett et al. | 382/294 |
| 2006/0146071 A1* | 7/2006 | Morita et al. | 345/619 |
| 2006/0238546 A1* | 10/2006 | Handley et al. | 345/619 |
| 2006/0242148 A1* | 10/2006 | Rothpearl et al. | 707/7 |
| 2006/0242159 A1* | 10/2006 | Bishop et al. | 707/10 |
| 2006/0274145 A1* | 12/2006 | Reiner | 348/62 |
| 2008/0117230 A1* | 5/2008 | Wegenkittl et al. | 345/619 |

FOREIGN PATENT DOCUMENTS

| | | | |
|---|---|---|---|
| EP | 1424648 | * | 6/2004 |
| WO | WO 2005/055168 | * | 6/2005 |
| WO | WO 2005/119443 | * | 12/2005 |
| WO | WO 2006/094862 | * | 9/2006 |
| WO | WO 2006/132826 | * | 12/2006 |
| WO | WO 2008/005868 | * | 1/2008 |

OTHER PUBLICATIONS

R.N.J. Graham, et al DICOM demystified: A review of digital file formats and their use in radiological practice, Clinical Radiology (2005) 60, 1133-1140.*

Peter M et al. "Introduction to the DICOM standard", computer applications, published on line Sep. 2001, pp. 920-927.*

Jianguo Zhang et al. "PACS and Web-based image distribution and display",Computerized Medical Imaging and Graphics 27 (2003) 197-206.*

Javier Quiles et al., "A high resolution workstation prototype for diagnosis of digital mammograms" computer methods and programs in Biomedicine 71 (2003) 243-259.*

H K Huang PACS and Imagning Informatics, John Wiley & sons, Inc, 2004,"Display workstation", Chapter 11, pp. 277-305.*

H K Huang PACS and Imagning Informatics, John Wiley & sons, Inc, 2004, "PACS data management and web-based image distribution", Chapter 13, pp. 333-352.*

SIENET MagicView 300 Image Reporting, Image Processing and All That Goes With It software Version VA30 HS 6 pages.*

Minglin Li et al. "The evolution of display technologies in PACS applications",Computerized Medical Imaging and Graphics 27 (2003) 175-184.*

* cited by examiner

FIG. 5B
SIMULATION DISPLAY
MONITOR CONFIGURATION 1024 x 768

| | I1 | I2 | I3 |
| --- | --- | --- | --- |
| | I4 | I5 | I6 |
| | I7 | I8 | I9 |

FIG. 5A
ACTUAL PHYSICAL IMAGING
MONITOR CONFIGURATION 1920 x 1440

| | I1 | I2 | I3 |
| --- | --- | --- | --- |
| | I4 | I5 | I6 |
| | I7 | I8 | I9 |

0, 1 (0, 1440)
0, 0.67 (0, 960)
0, 0.33 (0, 480)
0, 0 (0, 0)   0.33, 0 (640, 0)   0.66, 0 (1280, 0)   1, 0 (1920, 0)

COMPUTER IMPLEMENTED METHOD AND SYSTEM FOR HANGING PROTOCOL CONFIGURATION SIMULATOR DISPLAYING DESIRED ORDER OF MEDICAL IMAGES DATA

CROSS REFERENCE TO RELATED APPLICATIONS

The present application claims the benefit of U.S. Provisional Application No. 60/757,683, filed Jan. 10, 2006, herein incorporated by reference.

BACKGROUND

The invention relates to a software simulator and appertaining method of using the software simulator for the Hanging Protocol.

The Hanging Protocol is a supplement of the Digital Imaging and Communication in Medicine (DICOM) standard and contains information about physicians' viewing preferences related to display capabilities for image information and other data. The Hanging Protocol is designed to be vendor neutral and permit interchangeability across product lines and implementation formats. It supports multi-modality and a full ability to utilize current display modes. It is extensible and flexible, but is not always easy to implement and retrofit, and is dependent upon reliable image attributes.

The goal for physicians and other users is to be able to conveniently define their preferred methods of presentation and interaction for different types of viewing circumstances and to have images sets automatically hung (i.e., arranged for display) according to the user's preferences on display systems of similar capabilities. The Hanging Protocol defines the display order of multiple multimedia elements, e.g., text, image and other data. The main goal is to facilitate the automatic and consistent hanging of images according to a definition provided by the users.

At present, there is no simulation that allows a user to preview and/or test various hardware configurations without actually having the target hardware.

SUMMARY

A new offline Hanging Protocol configuration (with an application) based on DICOM tags (public tags) is provided that is capable of saving results in a database.

Accordingly, an automated method is disclosed for providing a hanging protocol configuration to a user, comprising: providing a plurality of images and appertaining image data to a hanging protocol simulator; determining if a sufficient amount of information in the images and appertaining data is present to create a hanging protocol configuration or to locate a previously stored protocol configuration in a database; if a sufficient amount of information is not present, then querying a user for user data until a sufficient amount of information is present; if a sufficient amount of information is present, then providing a presented configuration that is a generated configuration or previously created configuration stored in the database to a user display based on at least one of: a) the information from the images and appertaining data, and b) the user data; and creating an efficiency percentage for the presented configuration and including the efficiency percentage on the user display.

A further manual method is disclosed for providing a hanging protocol configuration to a user, comprising: providing a query form by a hanging protocol simulator to a user display; entering user data regarding a hanging protocol configuration by the user into the query form; processing, by the hanging protocol simulator, the entered user data; determining if a sufficient amount of information in the user data is present to create a hanging protocol configuration or to locate a previously stored protocol configuration in a database; if a sufficient amount of information is not present, then querying a user for user data until a sufficient amount of information is present; if a sufficient amount of information is present, then providing a presented configuration that is a generated configuration or previously created configuration stored in the database to a display of the user based on the user data; and creating an efficiency percentage for the presented configuration and including the efficiency percentage on the user display.

A further method is provided, comprising querying a user as to whether the automated or the manual procedure is needed.

Finally, a hanging protocol software simulator is provided, comprising: a processor, a user display, and a user input device; an image database comprising a plurality of images and appertaining image data; a hanging protocol configuration database comprising stored hanging protocol configurations; a software module that determines if a sufficient amount of information in the images and appertaining data is present to create a hanging protocol configuration or that locates a previously stored hanging protocol configuration in the hanging protocol configuration database; a software module that, if a sufficient amount of information is not present, provides a user query on the display for user data entry via the input device until a sufficient amount of information to create the hanging protocol configuration is present; a software module that, if a sufficient amount of information is present, provides a presented configuration on the display that is a generated configuration or previously created configuration stored in the hanging protocol configuration database to a user display based on at least one of: a) the information from the images and appertaining data, and b) the user data entry data; a software module that creates an efficiency percentage for the presented configuration and includes the efficiency percentage on the user display; a software module that provides a query form to the user display; a software module that accepts entry of user data from the user input device regarding a hanging protocol configuration into the query form; and a software module that processes the entered user data for the hanging protocol configuration.

Advantages of using this system include saving money in that customers can configure a Hanging Protocol design without requiring the actual hardware utilized in the design—the system only requires the hardware necessary for utilizing the Hanging Protocol simulator. Furthermore, the creation and/or modification of Hanging Protocols can be made either: a) automatically, by sending images to the simulator and receiving the configuration based on these images, or b) manually, in which case the user utilizes a Hanging Protocol editor to define the preferred screen layout.

Additionally, the user is also able to define a preferred screen layout and then test it, without need of available real hardware—the user can check the performance of the configuration long before investing in the ultimately required hardware. Furthermore, the user can save time by being able to receive the configuration any time and any where, without being connected to the specific necessary hardware.

The simulator permits different variations—the user can add or to eliminate one or more components of the simulator, depending on needs or capabilities. For example, if there is a new type of hardware or a new version of hardware on the market, the user can test it out using the simulator. The simulator creates a configuration and makes a demo with the included new hardware available to the user so that the user can determine the advantages of the new hardware well before buying it.

Use of the Hanging Protocol simulator can further reduce network traffic, since the user doesn't need to download the configuration at his workplace and then test it using his own images. The user can check the Hanging Protocol directly via a server, using, e.g., available demo images.

Advantageously, the simulator is a software application that can work on a laptop computer, desktop PC, or any other commonly available hardware. This is a huge benefit for customers and sales people during the presales phase (customer visits, conferences, etc.) and during the usage of the PACS system to get better results (permitting use of the system in a better and more efficient way).

DESCRIPTION OF THE DRAWINGS

The invention is explained in more detail below with reference to various preferred embodiments illustrated in the drawing figures.

FIGS. 5A-C are pictorial illustrations of physical imaging monitor configurations and simulated display monitor configurations.

DETAILED DESCRIPTION OF THE PREFERRED EMBODIMENTS

Figure 1A:
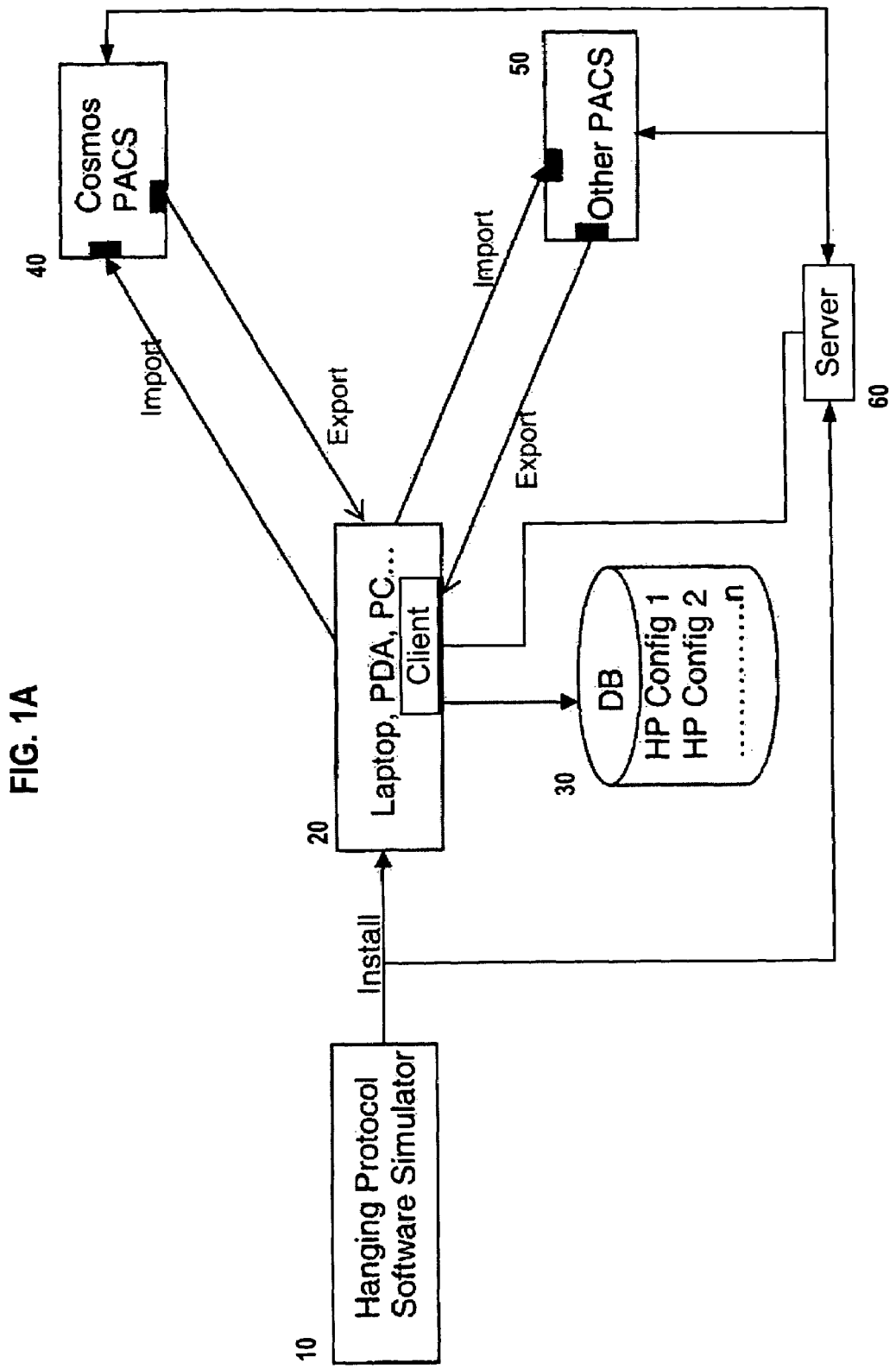
FIG. 1A is a block diagram of an overall system in which the Hanging Protocol Software Simulator is used.

As a general overview, by way of a hardware simulator, Hanging Protocols can be created or modified and made available to customers/users for testing. The customers are able to download Protocols that match with their hardware, e.g., equipment components or equipment version. There are two possibilities to create/modify Hanging Protocols:

1) The customer sends the images to the simulator. On the basis of the information offered by the images, the simulator creates a Hanging Protocol. The parameters which are not detected by the simulator will be either selected automatically (default parameters) or can be selected manually by the user. In the latter case, the user will receive a query by which the needed parameters can be chosen. If the user rejects the query, the simulator can automatically utilize standard or default values.

2) The simulator facilitates the creation/modification of the Hanging Protocol via a Hanging Protocol Editor. The simulator provides a step-by-step guide for the creation/modification of Hanging Protocol. It guides the user via various display screens and permits almost limitless Hanging Protocol configurations.

After the user has logged in at, e.g., the web server, he receives a query which demands from user a definition of a preferred Hanging Protocol. The user fills in a template with information (for example, how many monitors are available at the workplace, for which organs, modalities, studies, series, needed for the Hanging Protocol). The user then sends back the filled template to the simulator. The query is analyzed and the most appropriate/compatible Hanging Protocol is chosen or created and sent to the customers for testing.

For each Hanging Protocol, the customer receives an efficiency percentage which shows how effective the configuration is. The simulator will propose, if necessary, an increase of efficiency of the work and will provide other possible Hanging Protocols based on possible updated/improved software or/and hardware. The user can test immediately the efficiency of the configuration created on the basis of his definition, but also the improved configurations proposed by the simulator.

The simulator can provide demo images to the user. By watching the demos, the user sees the advantages and the disadvantages of each configuration. The simulator is able to simulate non-existent hardware. For example, if the user has only one monitor available but the simulator provides a demo for two monitors, the user will be able to switch between the two simulated monitors via the console or mouse buttons (left or right keys of the console, left or right mouse buttons, for example), or possibly via a resealing of the displays. The user may be provided limited access to the demo. In this way, the user doesn't need to actually download the configuration at his the workplace to check the efficiency of the configuration.

An editor of a PACS environment may be used to design the screen display layout formats in functions of user or group of users and their rights, monitor configuration, image segment, image type, organ, modality, etc. New other determining factors could be mixed modality, study, series and post processing application.

The Hanging Protocols can be customized, depending on user. The customer could be a physician or a hospital. For the hospital, a configuration with ramifications for all departments could be possible. In this case, the customer (the hospital) will add to the query for how many department he needs a configuration. The configuration is customized depending on departments and on the hardware and software systems of each department. The query will guide the user through the choosing/modification process by means of various screens.

In more detail, and with reference to the Figures, FIG. 1A illustrates an exemplary system in which the Hanging Protocol software simulator may be used. Accordingly, the simulator 10 may be installed on any applicable computer 20, such as a desktop PC, laptop, PDA, or other such device. The simulator 10 may also be constructed to run in a client 20—server 60 configuration so that various processing burdens can be allocated according to various design criteria. Various Hanging Protocol configurations are stored in a database 30 that the computer 20 has access to. The computer 20 further has the ability to import and export data from a Picture Archive and Communication System (PACS) 40 or other types of PACS systems 50. In order to design or define a new Hanging Protocol configuration, one may utilize a tool as used in a PACS environment. An editor may be used to design the screen display layout formats in the function of monitor configuration, image segment, image type, organ, modality, etc. The system may be used by any manufacturer as well as radiologists dealing with design of the screen display layout formats. These configurations may serve as the basis for stored configurations 30 that are utilized by the simulator 10.

The Hanging Protocol configuration (with the layout design) can both be imported from a PACS system 40, 50 and can conversely be reciprocally exported on other PACS systems 40, 50 or on a standard computer 20. This could permit customization for other systems (manufacturing, sellers, marketing, etc.) that use configurations based on a particular hardware configuration.

The Hanging Protocol configurations that are stored in the database 30 may be defined by utilizing DICOM tags. A DICOM tag consists of two parts: a Group number followed by an Element Number. For example, in the tag, "0010 0100", the first four (Group) digits indicate the type of information and the value "0010" that that the following information is about a "Patient"; the last four (Element) digits uniquely identifies a data item or specific instance, e.g., "0100" indicates the patient name.

The following table identifies various DICOM tags used, in which the column VR relates to a Value Representation. The VR of the tag describes the data type of the value—it can be Explicit or an Implicit. If it is Explicit, the data type is mentioned. If it is Implicit, the data type is not mentioned. The column VM relates to a Value Multiplicity. The VM of a data element specifies the number of values that can be encoded in the value field of that data element.

post processing application in different windows is available on the same workplace; e) expansion and/or updating of the Hanging Protocol software simulator 10: the expansion or updating may be customer dependent; and f) ward—this means, e.g., a physician from the neurology ward can dispose from other determining factors in configuring his Hanging Protocol as a physician from cardiology.

After a user has installed the hardware simulator 10 on his standard PC, laptop, etc., 20, he can shape a configuration depending on the available hardware or he can simulate not available hardware to check its advantages, as part of a learning process, or for demonstration purposes. An appropriate Hanging Protocol that matches with a client query sent to the server 60 can be downloaded, for, e.g., a home computer or for travel. Furthermore, the Hanging Protocol simulator 10 can also be customized for, e.g., marketing, presales, etc.

| Tag | VR | Item | VM | DICOM Approved |
|---|---|---|---|---|
| (0002, 0000) | UL | MetaElementGroupLength | 1 | dicom98 |
| (0002, 0001) | OB | FileMetaInformationVersion | 1 | dicom98 |
| (0002, 0002) | UI | MediaStorageSOPClassUID | 1 | dicom98 |
| (0002, 0003) | UI | MediaStorageSOPInstanceUID | 1 | dicom98 |
| (0002, 0010) | UI | TransferSyntaxUID | 1 | dicom98 |
| (0002, 0012) | UI | ImplementationClassUID | 1 | dicom98 |
| (0002, 0013) | SH | ImplementationVersionName | 1 | dicom98 |
| (0002, 0016) | AE | SourceApplicationEntityTitle | 1 | dicom98 |
| (0002, 0100) | UI | PrivateInformationCreatorUID | 1 | dicom98 |
| (0002, 0102) | OB | PrivateInformation | 1 | dicom98 |
| (0008, 0000) | UL | IdentifyingGroupLength | 1 | dicon98 |
| (0008, 0005) | CS | SpecificCharacterSet | 1 – n | dicom98 |
| (0008, 0008) | Cs | ImageType | 1 – n | dicom98 |
| (0008, 0012) | DA | InstanceCreationDate | 1 | dicom98 |
| (0008, 0013) | TM | InstanceCreationTime | 1 | dicom98 |
| (0008, 0014) | UI | InstanceCreatorUID | 1 | dicom98 |
| (0008, 0016) | UI | SOPClassUID | 1 | dicom98 |
| (0008, 0018) | UI | SOPInstanceUID | 1 | dicom98 |
| (0008, 0020) | DA | StudyDate | 1 | dicom98 |
| (0008, 0021) | DA | SeriesDate | 1 | dicom98 |
| (0008, 0022) | DA | AcquisitionDate | 1 | dicom98 |
| (0008, 0023) | DA | ContentDate | 1 | dicom2000 |
| (0008, 0024) | DA | OverlayDate | 1 | dicom98 |
| (0008, 0025) | DA | CurveDate | 1 | dicom98 |
| (0008, 002A) | DT | AcquisitionDatetime | 1 | dicom2000 |
| (0008, 0030) | TM | StudyTime | 1 | dicom98 |
| (0008, 0031) | TM | SeriesTime | 1 | dicom98 |
| (0008, 0032) | TM | AcquisitionTime | 1 | dicom98 |
| (0008, 0033) | TM | ContentTime | 1 | dicom2000 |
| (0008, 0034) | TM | OverlayTime | 1 | dicom98 |

Figure 1B:
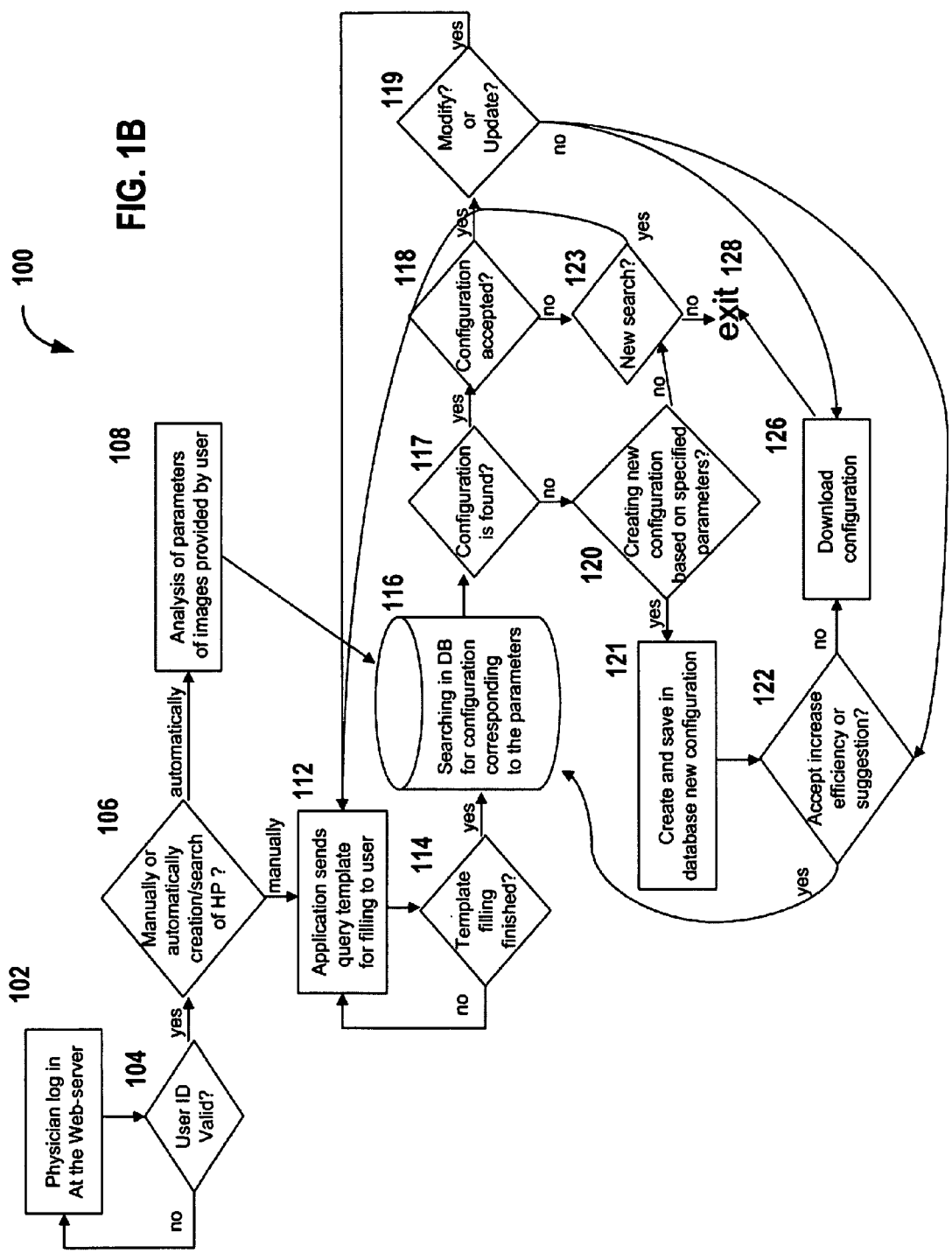
FIG. 1B is a flowchart illustrating a normal operation according to an embodiment of the invention.
Figure 2:
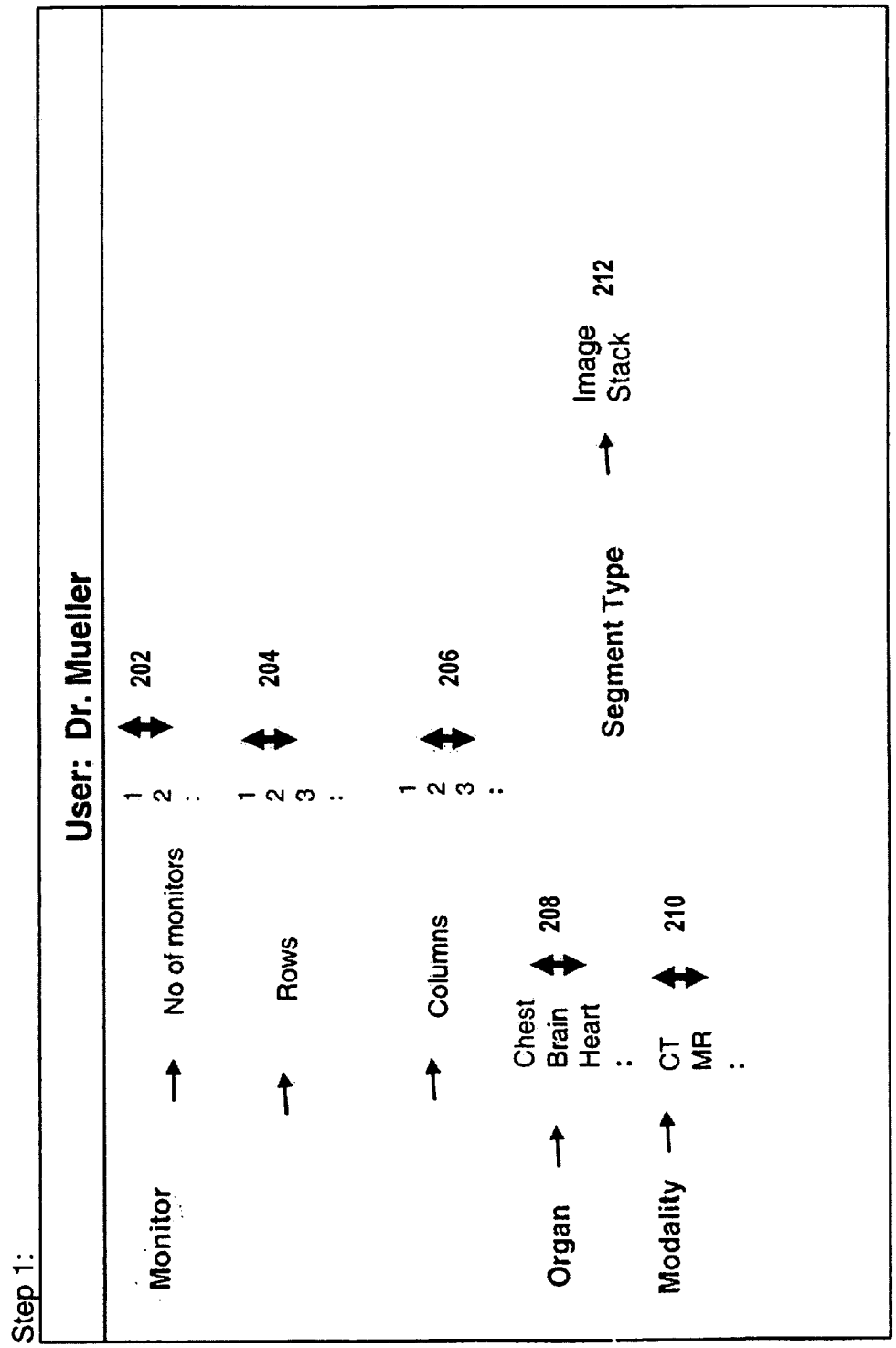
FIG. 2 is a pictorial screen shot illustrating a definition template-query.
Figure 3:
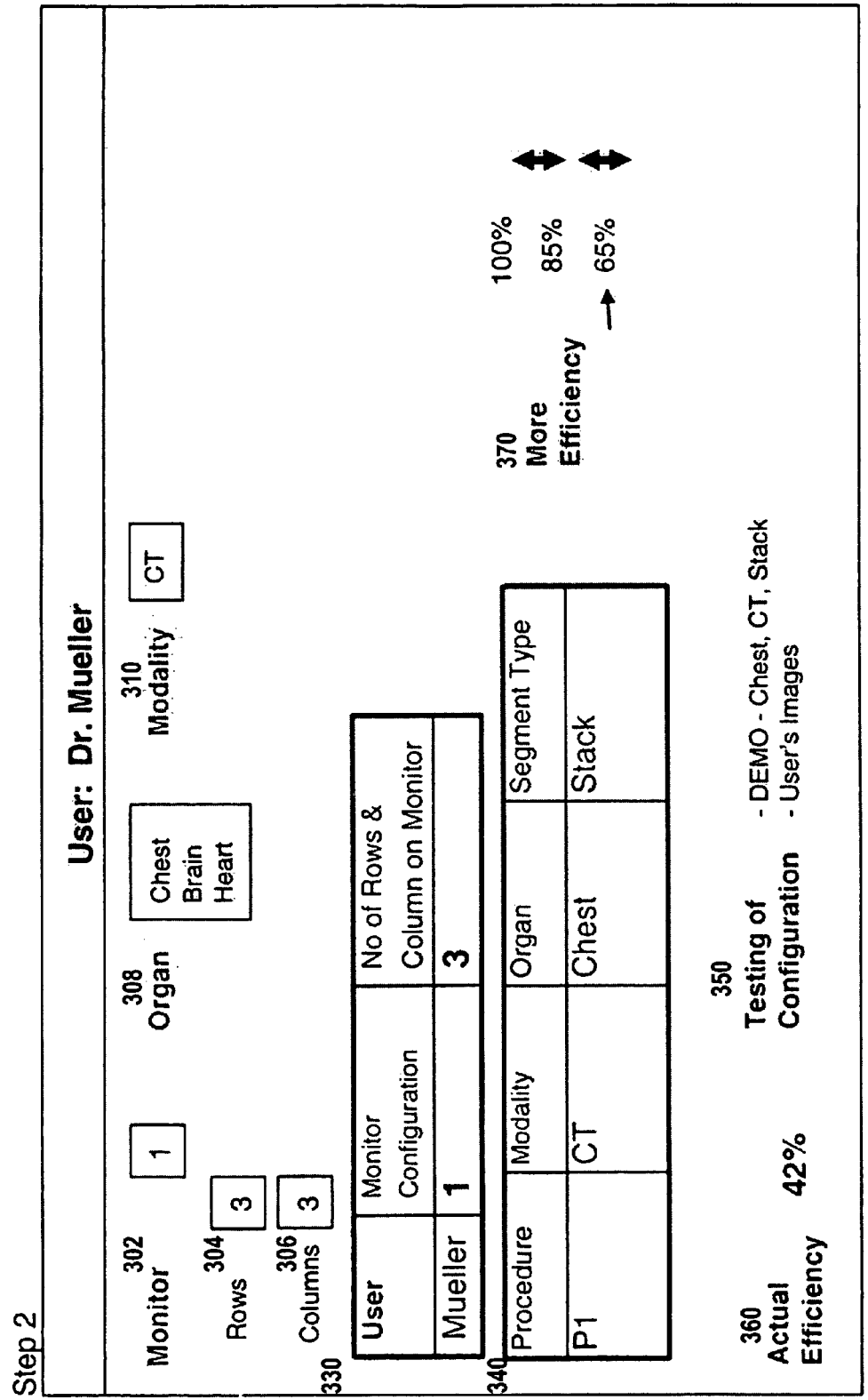
FIG. 3 is a pictorial screen shot illustrating a response form.
Figure 4:
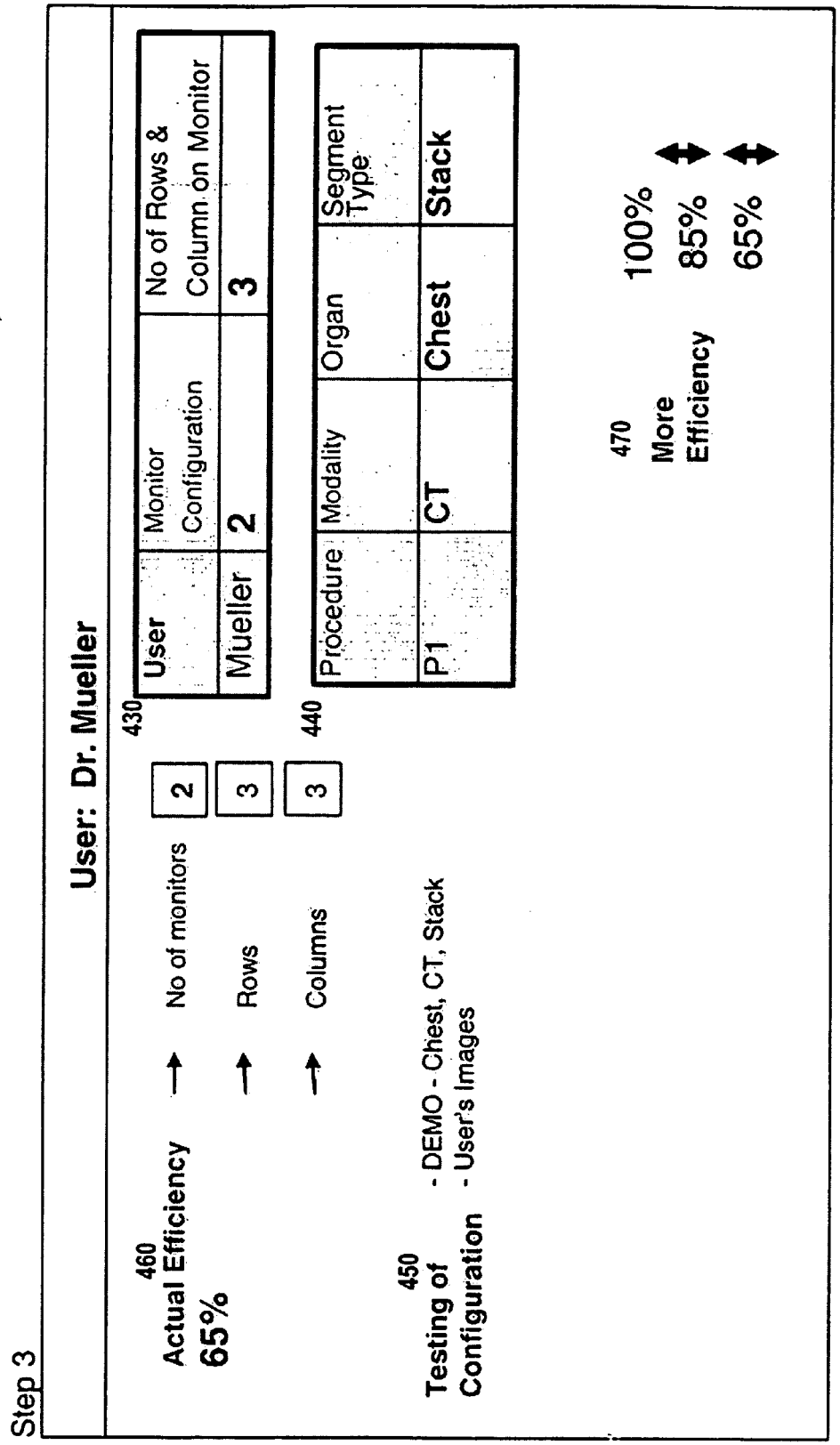
FIG. 4 is a pictorial screen shot illustrating a variant of the response form shown in FIG. 3.

Accordingly, any of these may be used in the definition of a particular Hanging Protocol configuration, but the invention is not limited by these. A Hanging Protocol editor may be used to design the screen display layout formats as a Function of a user or group of users and their rights, monitor configuration, image Segment, image type, organ, modality, workflow of clients, study, etc. Other Determining factors can include: a) mixed modality to include an optimal layout when Images from different modalities are available; b) authorization level of the user. For Example, a physician has other rights of configuration than a technician. A Technician uses a simplistic Hanging protocol. The physician can configure a Complex one. This means that the role of the user in the medical staff influences the access to the resources of the application; c) series, when a study is a part of multiple studies, the Hanging Protocol can manage displaying an entire series in a user preferred layout; d) post processing application: an optimal layout can be provided when different FIG. 1B is a flowchart illustrating a method of operation according to an embodiment of the invention, and FIGS. 2 through 4 illustrate various exemplary screen shots that may be displayed during operation. According to the exemplary method 100, a physician or other user logs in 102 to the system, which may be implemented on a web (or other type of) server 60.

According to an exemplary "use case 1", which will be utilized below to provide a concrete example for use of the simulator 10, a user (Dr. Mueller) needs a Hanging Protocol configuration for his workplace. As customer of the system, he has a username and a password assigned to him, and he uses these to log in. Any known authorization technique 104 may be utilized to grant access to the system, and this may be coupled to a known log-out procedure upon exit 128.

Dr. Mueller is asked whether a manual or automatic creation or search of a Hanging Protocol should be performed 106, and in a first example, he chooses the manual option.

Manual Option

In response, the simulator 10 sends 112 a definition template-query 200 to his display, as exemplified in FIG. 2, where he can define attributes of his preferred layout screen. Dr. Mueller chooses "CT" as the modality 210 and the chest as the organ to be examined 208. He further specifies that he has one monitor 202 and that the number of rows 204 and columns 206 to display are each three (all of these values may default to a particular value, e.g., one, that can, for example, be based on a configuration file). The number of rows and columns that can be configured could be designated up to a maximum possible value for a particular monitor and particular layout. The layout thus may comprise regularly spaced rows and/or columns. For these regular layouts, the specifying of row and column information is enough. In exemplary use case 1, the current monitor configuration is limited by the user to three rows and columns. As a segment type, Dr. Mueller chooses "stack", which infers the use of multiple images or other data objects in a series.

After he finishes 114 filling out the template 200, he initiates sending the query to the simulator 10, for example, by clicking on a "Send query" button displayed on the screen. The simulator 10 then searches in the configuration database 30 for a configuration that corresponds to the parameters of the query 116. If the data is not sufficient or the parameters are not properly chosen (the user has forgotten to choose one important parameter, or the parameters he has chosen are not proper for his role, for example) the user is notified and receives the template back 112 with the places to fill or parameters to be changed (these can be highlighted).

If the data the user provided is enough to start searching for an already existent HP, the application will start the search 116. If one or more configurations corresponding to the specified parameters are found 117, the application displays the results. The user is prompted as to whether to accept the configuration or not 118. If so, the user is given the opportunity to modify or update the configuration 119. If the user wishes to modify or update the configuration, then the application sends the query template for filing to the user 112, and the process is repeated from this point. If there is more than one configuration, the user can analyze all of them and reject, update, or modify them. If the configuration is not accepted, the user can either perform a new search 123, bringing him back to the query template 112, or exiting the program 128.

If no configuration is found, the application will ask the user if he wishes to create a new HP or if he wishes to modify the parameters he has already specified and starts another search 120. If the user prefers to create another one 121, the application will create another one and save it into the database. The result will be displayed. The user can accept an increased efficiency or a variant suggestion 122. If the suggestion is accepted, then the system returns to the searching in the database 116 for a corresponding configuration. Otherwise, the configuration is downloaded 126 and the program can be exited 128.

The criteria for searching a specific configuration in the database are the parameters. For example, if the user desires a configuration for X-ray, chest, the program takes these two parameters as key words and checks in the database for existing configurations corresponding to these two parameters. If the program finds two configurations that match to the two input parameters, the program will show them both.

The next step for the user is to choose one or to keep both. The user is able to modify or update the configuration(s). He can reject them and start another search; if there is no already existent configuration, a new one is created.

The search of the configuration is based at least of one of the following criteria:
  user related data (user data, group data, role data, ward data, etc.);
  image parameters data (modality, organ, etc.);
  hardware parameters data (number of monitors, etc.);
  patient specific data (private insurance, etc.);
  other criteria.

The user is also able to choose a configuration created by another physician, Dr. Schmitt, for example.

Automatic Option

If Dr. Mueller chooses 106 to have an automatic creation of a Hanging Protocol, then he provides the simulator 10 with a list of images to be used by the simulator 10 in creating the Hanging Protocol. This list can be provided in any known manner, including providing an actual copy of all relative files, providing a link to a storage area where the image files are kept, etc. This list of images might comprise images of different sizes, modalities, etc.

The simulator 10 then determines if there are enough factors to create the Hanging Protocol 110 (the criteria being defined in more detail below with respect to use case 1a). If not, the manual option described above is performed, beginning with the sending 112 of a definition template-query 200 to his display. The template-query 200 provided is a fairly simplistic implementation of a query form. In theory, this template-query 200 could be complex and could request any number of parameters from the user using known user interface methods. An analysis of the parameters of images provided by the user is performed 108 in order to establish the database searching 116.

In either the manual or the automatic option, once a hanging protocol is located in the database 116 or created 110, Dr. Mueller receives a response form 300 (FIG. 3) that matches the query/provided images. In the exemplary form 300, it can be seen that there is one monitor 302 having three rows 304 and three columns 306, that the organ chosen is the chest 308, and the modality is CT 310. This information is summarized in a user display grid 330 and a procedure display grid 340. The testing configuration 350 is provided as is the actual efficiency 360.

Efficiency indication provided by the simulator 10 is a valuable component. Together with the configuration created by the software simulator 10, a user receives an efficiency percentage showing him the performance of the configuration at the workplace. This permits a user to be able to see the changes that could be made in the configuration for increasing the performance, and the corresponding changes in the hardware or software at the workplace.

In the present example, because of the limited number of monitors (one) indicated, the actual workflow is estimated at a 42% efficiency. A 100% efficiency is defined by using the newest models of apparatus in a domain, the highest matrix resolution, the maximum of available monitors for examination, etc. The efficiency is relative to the new software and hardware of the market and it is updated each time improved software and hardware are released in the marketplace.

It is important to distinguish between "user efficiency" and "tool/simulator efficiency". An example of "user efficiency" is as follows: when querying the database, a set of HP's are displayed prioritized. The simulator user can select one or more of these displays. The first selected will be the default when an image call-up is done. The other HP's can be selected by using function-keys or similar mechanisms. In this way, both the simulator-user and the end-user have the chance to quickly and easily switch between pre-selected HP's.

Continuing on with the example situation, Dr. Mueller can test the configuration by choosing the demo of a CT chest stack (in place of his own actual images), available on, e.g., the server 60. The simulator 10 provides the possibility to increase the efficiency of the work by making changes in the configuration. The user can choose, in the present case, a percentage between 43% and 100% efficiency according to a selector 370 to improve efficiency. However, it is also possible that the system could be used to determine the detriment to efficiency caused by removal or replacement of hardware.

In the present exemplary case, Dr. Mueller needs a 65% efficiency, and therefore selects 65% from the selector 370 for requesting the corresponding configuration 122. The database 30 is again searched 116 for a configuration corresponding to the query, and Dr. Mueller receives the new configuration with the resultant changes/recommendations, as illustrated in FIG. 4 by the form 400 and appertaining display elements (note that FIG. 3 and FIG. 4 are just simply variants on a screen design and either can be used).

In this case, the existence of the second monitor (indicated by the number "2" in the monitor field) could be a possibility to increase the efficiency of the work. Other possibilities could potentially be to increase the number of rows or columns on the monitor, but since the present example is premised upon a maximum of three rows and three columns, this option would not be possible here.

A further important parameter is the number of mouse clicks required, since higher efficiency is associated with fewer mouse clicks. An intelligent algorithm may be provided that calculates the number of mouse clicks needed by a user for an examination. By way of a general example:

Dr. Mueller specifies the following parameters for the configuration:

| For: | |
|---|---|
| Organ: | Chest |
| Modality: | X-ray |
| Number of study: | 2 |
| 1. Anterior | |
| 2. Posterior | |
| Then: | |
| Number of monitors: | 1 |
| Number of view ports: | 1 |

The Hanging Protocol simulator may the search in the database for a configuration based on these parameters. If no configuration is found, a new one is created and saved in the database. The application will show an efficiency of 75%. Dr. Mueller desires a 100% efficiency. In order to reach this desired efficiency, the program suggests two variants:

| VARIANT 1 | |
|---|---|
| Number of monitors: | 1 |
| Number of view ports: | 2 |
| VARIANT 2 | |
| Number of monitors: | 2 |
| Number of view ports: | 1 |

The algorithm may then calculate the number of required mouse clicks. Using one monitor and one view port, Dr. Mueller will have to click almost twice as much than if he uses 2 monitors, each monitor having one view port, or only one monitor but with 2 view ports. The efficiency can be calculated also depending on how many clicks the user needs for examination.

So, e.g., a criterion for 75% efficiency could relate to the number of required mouse clicks. The physician may have to click far too many times until he sees both studies, for example. The suggestions provided can therefore serve to decrease the number of mouse clicks that are required. The efficiency depends on the parameters. For a configuration for an MR brain procedure, there are more parameters to specify than for a configuration for X-ray chest procedure. Note that it is not possible to define a general 100% efficiency criterion. The 100% efficiency depends on the specific use case, meaning that a 100% efficiency must be defined for each individual use case.

Display hardware resolution is presently not a factor. But, in the future, resolution and other hardware components can play an important role in the efficiency criteria. Instead of performing a "precise" efficiency value, one may simply assess the efficiency in a broad category, e.g., values of 25%, 50%, 75%, and 100%. These criteria are only described by way of illustration.

Based on the above described example, the simulator 10 is capable of simulating the existence of a second monitor. For testing the efficiency of the configuration proposed by the simulator 10, Dr. Mueller may utilize the available demo corresponding to the new configuration 120. Without to need to install another physical monitor, Dr. Mueller is able to switch, on his screen, from one simulated monitor to the other simulated monitor by taking a suitable action, such as pressing the left/right keys of his console.

Alternately, as illustrated in FIGS. 5A-C, a scaled-down/pixel-reduced variation of the Hanging Protocol could be displayed. FIG. 5A illustrates an actual physical imaging monitor configuration having three rows, three columns, and a resolution of 1920×1440. In the single-monitor variant, a simulated display is provided on a monitor having a resolution of 1024×768 (FIG. 5B)—thus, the three rows and three columns are correspondingly reduced in size for display according to the simulation. When the two-monitor simulation variant is selected, this may be simulated on the same simulation display monitor having a resolution of 1024×768 by the image shown in FIG. 5C. Accordingly, two pixel-reduced simulated monitors are displayed side-by-side, each having three rows and three columns. It may further be possible to implement a zoom function on the simulation display so that the effect of the limited resolution can be minimized or possibly eliminated all together.

Dr. Mueller does not have to download the actual configuration at his workplace, but can test the configuration directly on a server 60 using standard images available to the user and corresponding to the chosen configuration.

By way of further example, in a variant use case 1a, Dr. Mueller sends a CT stack of images to the simulator 10. The simulator 10 analyses the images 108 and defines a Hanging Protocol configuration based on the parameters offered by the images.

As parameters, the simulator 10 finds from the submitted images themselves: "CT" and "stack". However, the simulator 10 determines 110 that it does not have enough parameters to create a Hanging Protocol. The simulator 10 needs to know if Dr. Mueller works with one or more monitors and with how many rows and columns there are on each monitor.

Although FIGS. 2-4 show a simplified common display area for the number of rows and columns, and this appears to be fixed for each of the multiple monitors, there is nothing that prohibits the input and display of differing numbers of rows and columns for each different monitor, based on a particular monitor ID. Information regarding various monitor IDs (such as model, resolution, scanning frequency, max rows, max columns, appertaining user, etc.) can be stored in a database of monitors that may be accessed and displayed by the simulator.

In the event that there are not enough parameters to create the Hanging Protocol 110, the simulator will send to the user a query 200 asking for more details about the preferred layout screen 112. In the present illustration, if Dr. Mueller were to reject the query 200, then the simulator 10 would select automatic default values for the parameters (one monitor with one row and one column). However, in the example, Dr. Mueller responds to the query by choosing 114 two monitors and four rows and columns. Then he sends the information back by e.g., pressing an Enter key or "Send query" button.

The simulator 10 then creates the configuration. Similar to the process described above, and with a form 300 as illustrated in FIG. 3, Dr. Mueller receives the configuration as well as the efficiency of the configuration during work. In the present example, the actual workflow is estimated by the simulator to 70% efficiency. Dr. Mueller tests the configuration 120 for the images he has sent to the simulator 10. In this situation, the simulator provides the possibility to increase the efficiency of the work by making changes in the configuration. Dr. Mueller, in this situation can choose a percentage between 71% and 100% efficiency.

Since, according to this use case, Dr. Mueller needs 85% efficiency, he then selects the 85% efficiency range asking for the corresponding configuration, and he receives a new configuration with the adequate changes. For testing the efficiency of the new configuration proposed by the simulator 10, Dr. Mueller uses the images that were sent to the simulator 10.

The efficiency percentage may also be replaced with recommendations or suggestions, as illustrated by the following example:

Dr. Mueller specifies the following parameters for the configuration:

| For: | |
|---|---|
| Organ: | Chest |
| Modality: | X-ray |
| Number of study: | 2 |
| 1. Anterior | |
| 2. Posterior | |
| Then: | |
| Number of monitors: | 1 |
| Number of view ports: | 1 |

The Hanging Protocol simulator will search in the database for a configuration based on these parameters. If no configuration is found, a new one is created and saved in the database. The application can display "recommendations" too. If Dr. Mueller accepts the option to see recommendations/suggestions for a better configuration, he may receive, in this example, two variants:

| Suggestions: | |
|---|---|
| VARIANT 1 | |
| Number of monitors: | 1 |
| Number of view ports: | 2 |
| VARIANT 2 | |
| Number of monitors: | 2 |
| Number of view ports: | 1 |

In a practical illustration, a hospital needs a new configuration for the departments already equipped with new apparatus. A hospital representative would ask for an installation of the Hanging Protocol simulator 10 on his server 60. After the hospital has, e.g., paid the license fees, the simulator 10 is installed on the server 60. The simulator 10 can create for each department/user a configuration corresponding to the new or old available equipment configurations. The process for creating the configuration(s) is similar to the process of use cases 1 and 1*a* described above.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

| LIST OF REFERENCE CHARACTERS | |
|---|---|
| 10 | Hanging Protocol software simulator |
| 20 | Computer |
| 30 | Hanging Protocol configuration database |
| 40 | PACS system |
| 50 | other PACS system |
| 60 | Server |
| 100 | method embodiment |
| 102-128 | method steps |
| 200 | definition template-query display |

-continued

| LIST OF REFERENCE CHARACTERS | |
|---|---|
| 202-212 | definition template display/entry elements |
| 300 | response form |
| 302-370 | response form display/entry elements |
| 400 | alternate response form |
| 430-470 | alternate response form display/entry elements |

What is claimed is:

1. A computer-implemented method for simulating on a computer a desired medical workplace hanging protocol configuration for a medical field user to preview and test without buying one or more pieces of at least one of not available or non-existent hardware for which said hanging protocol configuration to be simulated, said hanging protocol configuration comprising a display order of images, and text and data relating to said images, comprising the steps of:

providing a hanging protocol simulator comprising software and said computer, said computer having an associated user display to provide said desired medical workplace hanging protocol configuration to said medical field user, said simulator storing a plurality of images and corresponding data relating to said images;

in response to a query from said simulator requesting from the user a definition for said desired hanging protocol configuration, said user providing, as said definition, criteria comprising parameters data for said desired hanging protocol configuration, said user providing as said parameters data image parameters data comprising at least modality and organ, hardware parameters data comprising at least a number of monitors, number of columns and number of rows for arrangement of the images, and user-related parameters data comprising at least one of the data types selected from the group consisting of user data, group data, role data, and word data;

said simulator determining if a sufficient amount of said parameters data is present to newly create said requested desired hanging protocol configuration or to locate by searching based on said parameters data a previously stored hanging protocol configuration from a plurality of previously stored hanging protocol configurations as said desired medical workplace hanging protocol configuration;

if a sufficient amount of said parameters data is not present, then said simulator querying said user for additional parameters data until a sufficient amount of said parameters data is present;

if a sufficient amount of said parameters data is present, then said simulator showing on said user display said requested desired medical workplace hanging protocol configuration which is either said newly created configuration or said one previously stored configuration from said plurality of stored configurations; and testing by use of said user display said requested hanging protocol configuration to thus allow the medical field user to test without buying said not available or non-existent hardware for said requested desired hanging protocol configuration being simulated.

2. The method of claim 1 wherein said image parameters data further includes image type and image segment.

3. The method of claim 1 wherein said parameters data further includes patient-specific data.

4. The method of claim 1 wherein said stored images are provided by said user.

5. The method of claim 1 wherein the stored hanging protocol configurations are based on DICOM tags.

6. The method of claim 1 further comprising at least one of importing or exporting said stored hanging protocol configurations from or to an external picture archive communications system (PACS).

7. The method of claim 1 wherein said computer comprises a client of a server.

8. The method of claim 1 wherein said computer is selected from a group consisting of a desk top PC, a lap top PC, and a PDA.

9. A system for simulating a desired medical workplace hanging protocol configuration for a medical field user to preview and test without buying one or more pieces of at least one of not available or non-existent hardware for which said hanging protocol configuration to be simulated, said hanging protocol configuration comprising a display order of images, and text and data relating to said images, comprising:

a hanging protocol simulator comprising software and said computer, said computer having an associated user display to provide said desired medical workplace hanging protocol configuration to said medical field user, said simulator storing a plurality of images and corresponding data relating to said images;

said simulator requesting from the user a definition for said desired hanging protocol configuration, so that in response said user provides, as said definition, criteria comprising parameters data for said desired hanging protocol configuration, said parameters data comprising image parameters data comprising at least modality and organ, hardware parameters data comprising at least a number of monitors, number of columns and number of rows for arrangement of the images, and user-related parameters data comprising at least one of the data types selected from the group consisting of user data, group data, role data, and word data;

said simulator determining if a sufficient amount of said parameters data is present to newly create said requested desired hanging protocol configuration or to locate by searching based on said parameters data a previously stored hanging protocol configuration from a plurality of previously stored hanging protocol configurations as said desired medical workplace hanging protocol configuration;

if a sufficient amount of said parameters data is not present, then said simulator querying said user for additional parameters data until a sufficient amount of said parameters data is present; and if a sufficient amount of said parameters data is present, then said simulator showing on said user display said requested desired medical workplace hanging protocol configuration which is either said newly created configuration or said one previously stored configuration from said plurality of stored configurations, whereby by use of said user display said user can test said requested hanging protocol configuration to thus allow the medical field user totest without buying said not available or non-existent hardware for said requested desired hanging protocol configuration being simulated.

* * * * *